Jan. 13, 1970 | M. W. WOLFF | 3,489,104

DOUGH-CUTTING MACHINE

Filed Dec. 23, 1966 | 2 Sheets-Sheet 1

Jan. 13, 1970 M. W. WOLFF 3,489,104

DOUGH-CUTTING MACHINE

Filed Dec. 23, 1966 2 Sheets-Sheet 2

3,489,104
Patented Jan. 13, 1970

3,489,104

DOUGH-CUTTING MACHINE

Manfred Walter Wolff, Grunbach, Baden-Wurttemberg, Germany, assignor to Werner & Pfleiderer, Stuttgart-Feuerbach, Baden-Wurttemberg, Germany, a corporation of Germany Filed Dec. 23, 1966, Ser. No. 604,431
Int. Cl. A21c *5/04*
U.S. Cl. 107—15 4 Claims

ABSTRACT OF THE DISCLOSURE

A machine for cutting dough portions of identical weight from a dough supply provided with two adjacent parallel rollers rotatable relative to each other with each roller having at least four chambers spaced angularly about the periphery and interspaced by intermediate portions. The chambers are arranged in two pairs with the chambers in each pair being diametrically opposed and an injection element is movable within each chamber in a radial direction relative to the axis of the roller. Mechanism is also provided to move the injection elements as the rollers rotate, and means are present to insure that, as the rollers rotate, the open chambers of each roller passes adjacent to and in alignment with an intermediate portion of the other roller.

The present invention relates to a dough-cutting machine.

In one of the known machines for cutting portions of dough of identical weight from a dough supply, each of the two rollers rotatable relative to each other has two cutting or dividing chambers incorporating displaceable sliders or the like, with the chambers of the two rollers being arranged to operate in conjunction in receiving a portion of served dough.

Apart from the fact that the cutting speed of machines of this kind is no longer adequate for modern requirements, it has been found that the pinching of the dough and the heat generated thereby, causes deterioration, particularly of delicate types of dough.

In another known dough-cutting machine comprising a single rotatable roller and a filling piston coordinated therewith, analogous shortcomings are apt to arise, and moreover, the cutting speed required cannot be reached.

The present dough-cutting machine includes two adjacent parallel rollers rotatable relative to each other, each roller having at least four chambers spaced angularly around the periphery thereof and separated by intermediate portions, with the chambers being arranged in two pairs, the chambers in each pair being diametrically opposite one another, each chamber having an ejection element movable within the chamber in a radial direction relative to the axis of the roller, means for moving the ejection elements as the rollers are rotated and means for ensuring that, as the rollers rotate, the open chambers of each roller pass adjacent to and in alignment with an intermediate portion of the other roller.

This arrangement ensures a continuous flow of dough through the machine, prevention of excessive heating of the dough and excessive kneading of the dough, as well as a high speed of operation.

Preferably, the ejection elements situated in two aligned dividing chambers of a roller may be constructed in the form of double pistons, with the angle separating the pistons depending on the number of dividing chambers provided in each roller. A guide path may moreover be formed in the ejection elements of each roller, traversed by a rod passing through the roller as a whole. The rod may thus be organized to provide means for limiting the stroke of the ejection elements. A cam surface or control curve, which may appropriately be situated between the coupling shanks or the like of the ejection elements, may be incorporated according to another feature of the invention, to limit the stroke in one or both directions.

The thickness of the coupling shanks of all ejection elements housed in a row of dividing chambers of one roller may be chosen so that it does not exceed the width of the chamber, thus resulting in a simple and compact construction, applicable even with six, eight or more dividing chambers per row. A cam surface or control curve may appropriately be coordinated with the coupling shanks in such manner that the cam surface or curve and the coupling shanks lie within the width of the dividing chamber and with the heads of the ejection elements being placed or held in a definite position by the cam surface or curve, within a predetermined range of operation.

Each of the rollers may comprise a reciprocating and/or ejection device which may be coordinated with each of the ejection elements in such manner that the reciprocating device effects metering of the dough in an initial stage by virtue of a predetermined intermediate position, and in a second stage effects ejection of the portion of dough from the chamber by the ejection element. This results in a positive control over the ejection elements, thereby permitting a high working and thus cutting speed without losing uniformity of operation.

The machine may have a pair of conveying or kneading rollers preceding the counter-rotating rollers containing the chambers, with their peripheral speed corresponding in each instance, or not, to that of the dividing rollers they precede, and the latter rollers run in the same direction. The peripheral speed of the pair of conveying rollers may be adjustable in infinitely variable manner, for an appropriate infeed of the preformed web of dough. The dimensions of the web or ribbon of dough passing between the conveying rollers may then be chosen in such manner that the dividing chambers are filled completely without a formation of dough off-cuts.

The invention will now be described in detail with reference to the accompanying drawings, which show an embodiment of the invention, but in no restrictive sense.

Figure 1:
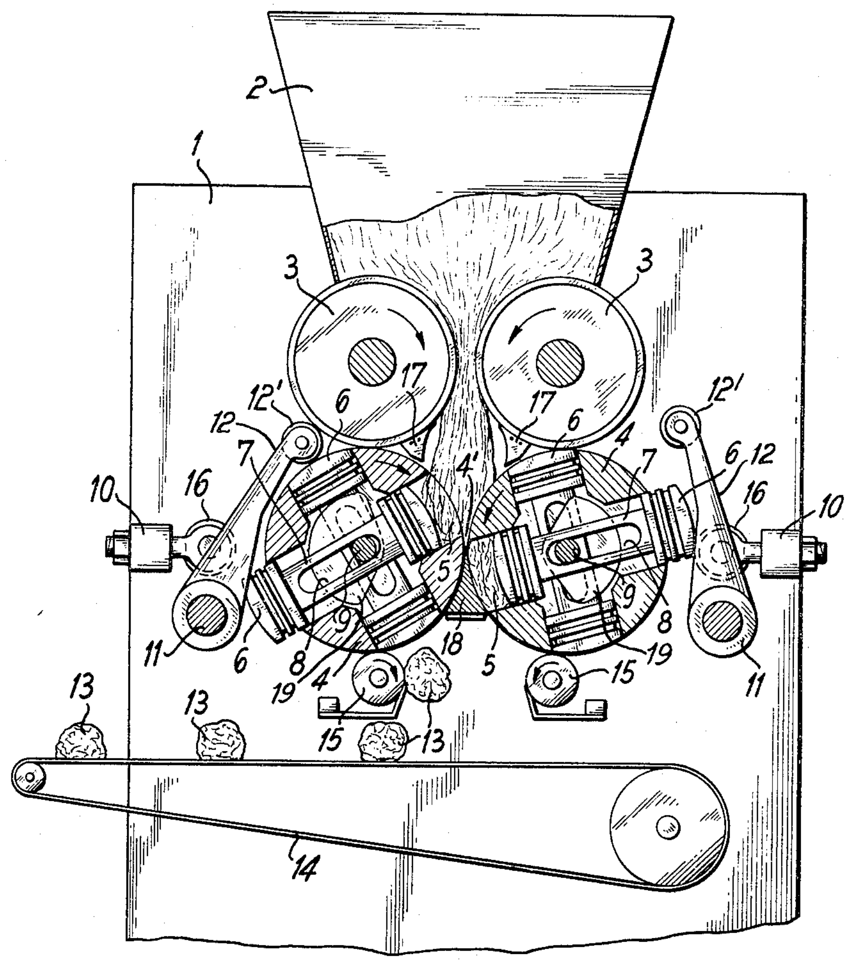
FIGURE 1 is a view partly in elevation and partly in cross-section of a dough-cutting machine.

The dough to be shaped is received in a funnel-shaped storage container 2 arranged in a machine frame 1. A counter-rotating pair of conveying or kneading rollers 3 is positioned beneath the lower extremity of the storage container 2 for shaping the dough present in the container into the form of a ribbon or web whose thickness depends on the contingently adjustable distance between the pair of rollers 3.

Beneath the rollers 3 are situated two rollers 4, rotatable relative to each other, and adjacent each other so that they define a nip 4'. Each roller comprises four dividing chambers 5 with the chambers being arranged at right angles to each other. The chambers thus form cruciform bores and each bore receives an ejection element 6. The element 6 is a double piston with terminal piston heads or crowns and is displaceable in the bore. The piston heads arranged at the outer extremities of the ejection elements slide in close contact with the inside of the chambers, and their coupling shanks 7, have a width essentially amounting to half that of the heads. As apparent from FIGURE 1, this results in peripherally regular arrangement of the dividing chambers 5 of the two rollers 4.

Each coupling shank also has a guide slot 8 which is traversed by a guide rod 9, passing through the entire roller 4. In combination with the guide rod, the guide slot ensures a stroke limitation for the ejection elements.

Figure 2:
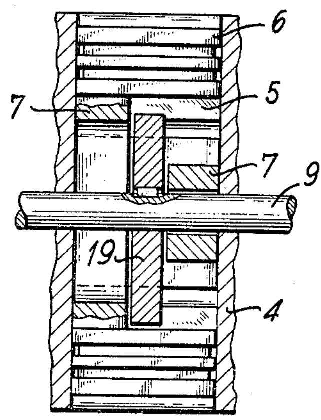
FIGURE 2 is a view taken along the line II—II of FIGURE 3, the view looking in the direction of the arrows.
Figure 3:
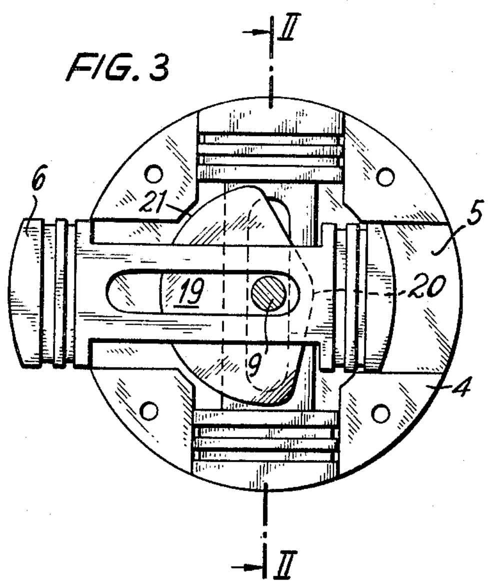
FIGURE 3 is an elevational view illustrating a row of dividing chambers provided with a cam surface or control curve co-ordinated with the ejection elements.

As illustrated in FIGURES 2 and 3, a stroke limitation may alternately be provided by means of a cam surface or control curve 19 which is keyed on the corresponding guide rod 9 and situated between the coupling shanks. To this end, the shanks are of reduced thickness. The cam plate 19 which cooperates with the lower side of the ejection element 6 moveable in the chamber 5 is so formed that its lowest point 20 is directed toward the middle of the machine. The higher point 21 of the plate 19 is directed outwardly and extends in the shape of an arc of a circle approximately over half the circumference.

In this condition, the dividing chamber 5 is filled with dough, metered by means of a volume adjusting device 10, 16, co-operating with the ejection element, and ejected by means of an ejection device 12, 12 acting through the ejection element.

The ejection device 12 may comprise a lever 11, whose free extremity bears a roller 12' thrusting the corresponding part of the ejection element 6 into the position ejecting a portion 13 of dough received in the opposed dividing chamber 5. A small, fast-running rebound roller coordinated with the corresponding rollers 4 facilitates placing the portions 13 of dough on a conveyor belt 14.

The volume adjustment devices 10, 16 co-ordinated with the rollers 4, comprise a bearing rolls 16' co-operating with the parts of the ejection element projecting beyond the outer diameter of the roller 4, that is to say of the double pistons 6, for determining the weight of the dough received in the opposed dividing chamber 5 by a predetermined position of the ejection element. The rolls 16' may contingently be combined with a scale for adjustment according to specific weights of dough or to specific volumes.

During operation, the pair of conveying or kneading rollers 3 forms the dough of the storage container 2 into a ribbon or web, and feeds the same to the rollers 4. The peripheral speed of the rollers 3 is infinitely variable and may be adjusted according to the peripheral speed of the rollers 4 or to the size of the dividing chambers, or to both.

The dough is then forced into the nearest dividing chamber 5, which is that of the left hand roller 4 in FIGURE 1. The dough fed in by the rollers 3 is thus ducted alternately to a dividing chamber 5 of the roller 4 and to a dividing chamber of the other roller 4. As apparent from the drawings, a dividing chamber of one roller is always aligned on a closed peripheral section of the mating roller. The dividing chambers 5 may be of such size as to obtain hardly any or no overlap between the dividing chambers during rotation of the rollers 4, so that any excess of dough may contingently be passed from one dividing chamber to another. The bearing elements 16 of the volume adjustment devices 10 may cooperate with the head of the double piston 6 opposed to the filled dividing chamber 5 in such manner that the ejection element is pressed into the dividing chamber by a predetermined distance. Further rotation of the rollers 4 causes the part of the ejection element 6 projecting beyond the outer periphery of the rollers to be thrust back as far as the periphery of the roller, so that the portion of dough 13 present in the dividing chamber 5 is ejected, and passed by the rebound roller 15 to the conveyor belt 14 in the manner already described, for further processing.

The size and number of dividing chambers 5 present in one roller or in a row of chambers, as well as the size of the ejection elements 6, may evidently be adaptable to specific requirements.

The flow of dough from the storage container 2 may be guided by means of guiding elements 17 situated below the pair of rollers 3 and the guiding elements may be of a different form or arrangement according to the nature of the dough. A sealing wedge 18 situated between the rollers 4 adjacent the nip thereof, prevents a premature egress of the dough received in the dividing chambers 5 and ensures that the portions of dough are always of the same weight.

The cross-sectional shape of the dividing chambers, the configuration of the ejection elements, as well as the method of coupling and guiding the latter, may form the object of numerous modifications within the scope of the invention. The cutting or dividing speed may be adjusted at will, and in particular on conjunction with the speed chosen for the conveying or kneading rollers. Instead of four, one row may contain six, eight or more dividing chambers moreover, co-operating with corresponding ejection elements, stroke limitation and ejection devices.

I claim:

1. A dough-dividing machine including two adjacent parallel rollers rotatable relative to each other, a pair of conveying rollers preceding said two adjacent rollers driven in the same direction of rotation as said two rollers, each of said two adjacent parallel rollers having a recess providing at least four chambers capable of receiving dough and spaced angularly around the periphery thereof and separated by intermediate portions, said chambers being arranged in two pairs, with the chambers in each pair being diametrically opposite one another, an ejection element movable in each chamber in a radial direction relative to the axis of the roller, the ejection elements located in opposed chambers constituting a single displaceable member having opposite heads, cam means for each parallel roller mounted within the recess for controlling the position of each of said ejection elements within a predetermined range of displacement, the chambers and intermediate portions being so arranged that as the two parallel rollers rotate, the open chambers of each parallel roller pass adjacent to the intermediate portion of the other parallel roller whereby dough in each chamber is divided from the remaining dough and means adjacent the periphery of each roller for engaging the head of an ejection element to move the ejection element to eject the dough from the diametrically opposed chamber, the opposite head thereafter being free to be retracted to allow dough to be received in its chamber.

2. The dough-dividing machine as claimed in claim 1 in which said ejection elements located within the two opposed chambers of a roller constitute a single displaceable member, and there being provided stop means for limiting the displacement of the displaceable member when one of its two chambers receives dough.

3. The dough-dividing machine as claimed in claim 2 in which said two ejection elements of each displaceable member are connected by a connecting part, each ejection element having a head with the width of the connecting part being approximately half the width of each of the heads.

4. The dough-dividing machine as claimed in claim 1 further including a container for delivering dough to said conveying rollers, and a wedge member located between the pair of parallel rollers for preventing dough dropping between said two parallel rollers.

References Cited

UNITED STATES PATENTS

| | | | |
|---|---|---|---|
| 62,249 | 2/1867 | Bovey | 25—76 |
| 516,023 | 3/1894 | Rice. | |
| 896,056 | 8/1908 | Colborne. | |
| 1,408,550 | 3/1922 | Wakefield | 25—78 |
| 2,858,775 | 11/1958 | Marasso. | |
| 3,048,922 | 8/1962 | Steinkemper et al. | |
| 2,784,683 | 3/1957 | Curtis et al. | 107—69 |

WALTER A. SCHEEL, Primary Examiner

A. O. HENDERSON, Assistant Examiner

U.S. Cl. X.R.

18—21